United States Patent
Shore (10) Patent No.: US 7,559,698 B2
(45) Date of Patent: Jul. 14, 2009

(54) SPHERICAL BEARING ARRANGEMENT

(75) Inventor: David M Shore, Lincoln (GB)

(73) Assignee: Minebea Co. Ltd. (JP)

( * ) Notice: Subject to any disclaimer, the term of this patent is extended or adjusted under 35 U.S.C. 154(b) by 373 days.

(21) Appl. No.: 11/552,257

(22) Filed: Oct. 24, 2006

(65) Prior Publication Data

US 2007/0127857 A1 Jun. 7, 2007

(30) Foreign Application Priority Data

Dec. 7, 2005 (GB) .................. 0524970.1

(51) Int. Cl.
*F16C 23/04* (2006.01)
*B21K 1/02* (2006.01)

(52) U.S. Cl. .................. 384/192; 29/898.043

(58) Field of Classification Search .................. 384/192, 384/203, 208, 211, 212, 495–498; 29/898.043, 29/898.052, 899, 899.1

See application file for complete search history.

(56) References Cited

U.S. PATENT DOCUMENTS

| 2,126,388 | A | * | 8/1938 | Hoke et al. | .................. 384/212 |
| 2,983,558 | A | * | 5/1961 | Rudy | .................. 384/497 |
| 3,107,954 | A | * | 10/1963 | Rudy | .................. 384/212 |
| 4,242,784 | A | | 1/1981 | McCloskey | |
| 6,209,206 | B1 | | 4/2001 | Harris | |

* cited by examiner

*Primary Examiner*—Thomas R Hannon
(74) *Attorney, Agent, or Firm*—Hancock Hughey LLP (57) ABSTRACT

A split ball portion for a spherical bearing arrangement, which split ball portion is to form one of a plurality of split ball portions to be arranged together in a bearing housing of the spherical bearing arrangement to form a composite ball, the split ball portion comprising: an outer bearing surface; at least one separation face, which lies adjacent a separation face of a neighbouring split ball portion when forming the composite ball; and at least one axial end face, the split ball portion comprising at least one chamfer surface at the junction of at least the outer bearing surface, a separation face and an axial end face.

29 Claims, 6 Drawing Sheets

SPHERICAL BEARING ARRANGEMENT

The present invention relates to a spherical bearing arrangement and a method of assembly thereof.

The art of spherical bearings and indeed bearings in general requires the provision of precision engineered bearing surfaces wherein tolerances must be strictly adhered to ensure the smooth and effective operation of the bearings. As a consequence of keeping within these tolerances, bearings, and especially spherical bearings, are often expensive to manufacture.

Spherical bearings comprise a ball mounted in a bearing housing, wherein, typically, a bore passes through the ball. The ball comprises a spherical bearing surface and the bearing housing comprises a corresponding and complimentary spherical housing bearing surface. In use, the two bearing surfaces slidably engage with one another to form a bearing interface. The ball often further comprises two axial end faces, bounded by the spherical bearing surface and the bore surface.

Mounting the ball into the housing of a spherical bearing arrangement has proved difficult, since any method must result in the torque of the bearing being either substantially zero or within an often very narrow, predetermined, range. A conventional method is to provide a single ball and swage the bearing housing around the ball to fixedly retain it therein. However, ensuring the required torque of the resultant bearing has proved difficult.

Spherical bearings comprising a 'split-ball' arrangement go some way to alleviating the problems associated with single ball spherical bearings. Such an arrangement commonly comprises two (or sometimes three) split-ball portions which, when mounted together in the bearing housing, collectively define a composite ball which serves, in principle, as the ball of a single-ball spherical bearing arrangement. Each split ball portion comprises a separation face which, when the split ball portions are assembled into a housing, lies adjacent a separation face of a neighbouring split ball portion.

The main advantage of split-ball bearings is that they do not require swaging of the bearing housing and thus reduce manufacturing costs. The split-ball portions are mounted in turn, with one portion being installed into the bearing housing and engaging with the bearing surface, and the second portion being inserted and twisted by 90° to coincide with the other split ball portion. Consequently, it is easier to produce a split ball spherical bearing having a torque of substantially zero or within a predetermined range, since each part can be manufactured separately from one another.

Since spherical bearings are commonly used in the aerospace industry, weight is of paramount importance. It is desirable, therefore, to manufacture spherical bearings from a lightweight material, such as titanium or a titanium alloy. However, such a material does not offer the most desirable wear characteristics and is therefore susceptible to damage if foreign objects impact on the bearing surface. Any damage or wearing of the bearing surface drastically reduces the life of the bearing. In the aerospace industry, it is a common requirement that the life of the bearing arrangement outlasts the life of the aeroplane in which it is installed and thus the bearing is installed as a 'fit-and-forget' part. It is paramount, therefore, that the quality and integrity of the bearing surface(s) is(are) maintained at an optimum level so as to achieve this life. Clearly, if the bearing needs to be replaced, considerable costs will be incurred, both in terms of labour and part costs and downtime of the aeroplane.

It has been found when assembling split ball bearing arrangements that, as the second or subsequent split ball portions are rotated so as to coincide with the previously installed split ball portion(s), there is a tendency for a 'knocking' action to occur between a number of pairs of edges. One likely location of this knocking is between the respective separation faces of the split ball portions. Knocking can also occur between the edge of the axial end face of a split ball portion and the edge of the spherical bearing surface of the housing. As two respective edges knock against each other, material from one or both of the edges can be chipped away. Not only are the edges then not smooth, which results in increased degradation of any surfaces coming into contact with the damaged edge but also the 'chips' and other debris caused by the knocking tend to mix with any lubricant present to produce an abrasive slurry. This slurry not only then abrades the edges but is distributed across all the bearing surfaces, causing abrasion thereof also.

When assembled, it is often a requirement that the separation faces of adjacent split ball portions are frictionally engaged with one another so as to reduce the likelihood of the split ball portions rattling around inside the housing when assembled and also to reduce any vibrations. As a consequence of this frictional engagement, the likelihood of knocking is an unavoidable consequence with known split-ball bearing arrangements.

There is a need, therefore, for a bearing arrangement which overcomes at least some of the above problems and reduces the likelihood of damage caused by knocking.

Accordingly, the present invention provides a split ball portion for a spherical bearing arrangement, which split ball portion is to form one of a plurality of split ball portions to be arranged together in a bearing housing of the spherical bearing arrangement to form a composite ball, the split ball portion comprising: an outer bearing surface; at least one separation face, which lies adjacent a separation face of a neighbouring split ball portion when forming the composite ball; and at least one axial end face, the split ball portion comprising at least one chamfer surface at the junction of at least two of the three surfaces comprising: the outer bearing surface, the separation face and the axial end face.

The present invention further provides a spherical bearing assembly, comprising: a bearing housing; and at least two split balls portions according to any preceding claim; wherein the split ball portions are arranged together in the bearing housing so as to form a composite ball.

The present invention further provides a method of assembling a spherical bearing arrangement, the method comprising: providing a bearing housing; providing at least two split ball portions comprising: an outer bearing surface; at least one separation face, which lies adjacent a separation face of a neighbouring split ball portion when forming the composite ball; and at least one axial end face, the split ball portion comprising at least one chamfer surface at the junction of at least two of the three surfaces comprising: the outer bearing surface; the separation face; and the axial end face; assembling the split ball portions, in turn, in the bearing housing so as to form a composite ball.

The present invention further provides a split ball portion for a spherical bearing arrangement, a spherical bearing assembly, or a method of assembling a spherical bearing arrangement as defined by the claims.

The present invention will now be described, by way of example, with reference to the accompanying figures, in which.

Figure 1:
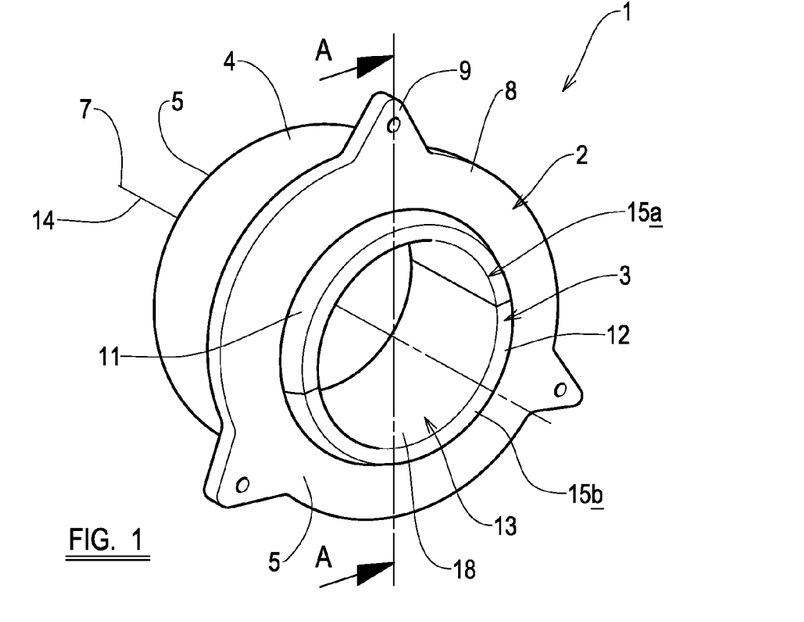
FIG. 1 shows a perspective view of a spherical bearing arrangement.
Figure 2:
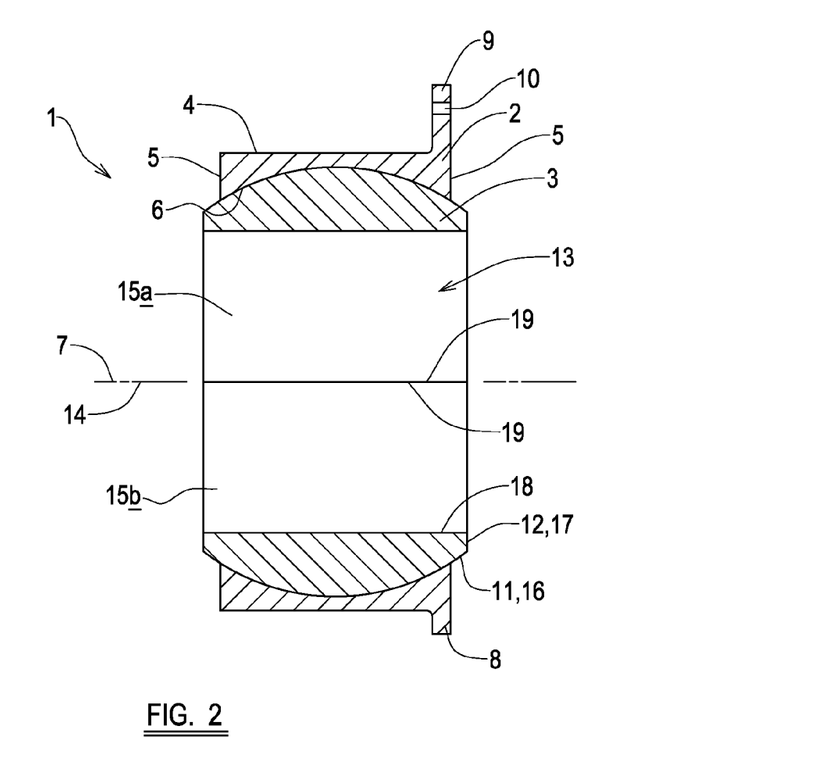
FIG. 2 shows a cross section of the spherical bearing arrangement of FIG. 1 along line A-A.

FIGS. 1 and 2 show a spherical bearing arrangement 1, comprising a bearing housing 2 with a composite ball 3 mounted therein. The bearing housing 2 is substantially annular and comprises: a cylindrical outer surface 4; two axial end faces 5; and an inner surface comprising a spherical housing bearing surface 6. The bearing housing 2 further has a central axis 7. The bearing housing 2 has a circumferential, radially extending flange 8 proximate an axial end face 5 of the bearing housing 2. The flange 8 carries three equi-spaced lobes 9 which each protrude from the flange 8. The equi-spaced lobes 9 are each provided with an aperture 10 through which a bolt or the like can pass, for fixing the bearing housing 2 by the lobes 9 to another object.

The composite ball 3 is substantially spherical in shape, providing: a spherical composite ball bearing surface 11; two axial end faces 12; and a bore 13 with a central axis 14. The composite ball bearing surface 11 conforms to the housing bearing surface 6 such that the bearing surfaces 6, 11 are in sliding contact with one another. Preferably, the torque between the composite ball 3 and the bearing housing 2 is substantially zero. Alternatively, the torque is within a predetermined range.

The composite ball 3 is formed from two substantially identical split-ball portions 15a, 15b. Each split ball portion 15a, 15b comprises: a hemi-spherical split ball bearing surface 16; two axial end faces 17; a semi-cylindrical inner surface 18 defining one half of the composite ball bore 13; and two separation faces 19. The separation faces 19 of each split ball portion 15 are substantially co-planar.

Preferably, the split ball portions 15a, 15b and the bearing housing 2 are made of titanium, a titanium alloy, or some other suitable light weight material. More preferably, the split ball portions 15a, 15b and bearing housing 2 are made of titanium alloy TA6V as per ASNA3307. Advantageously, the titanium alloy is coated with titanium nitride using a plasma assisted physical vapour deposition method.

Figure 3:
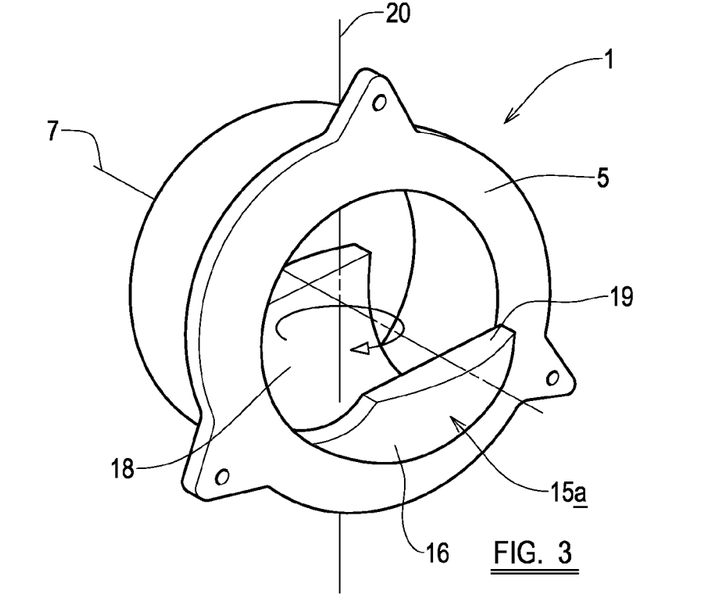
FIGS. 3-5 show stages of assembly for the spherical bearing arrangement of FIGS. 1 and 2.
Figure 4:
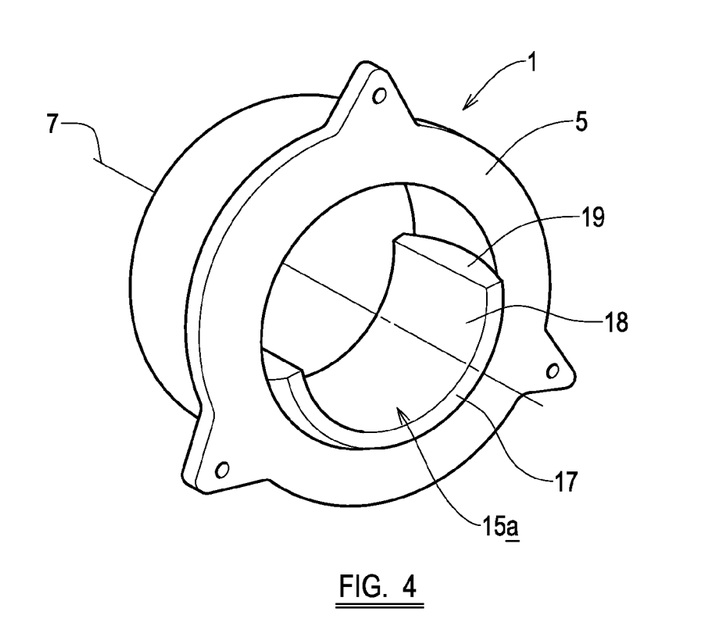
Figure 5:
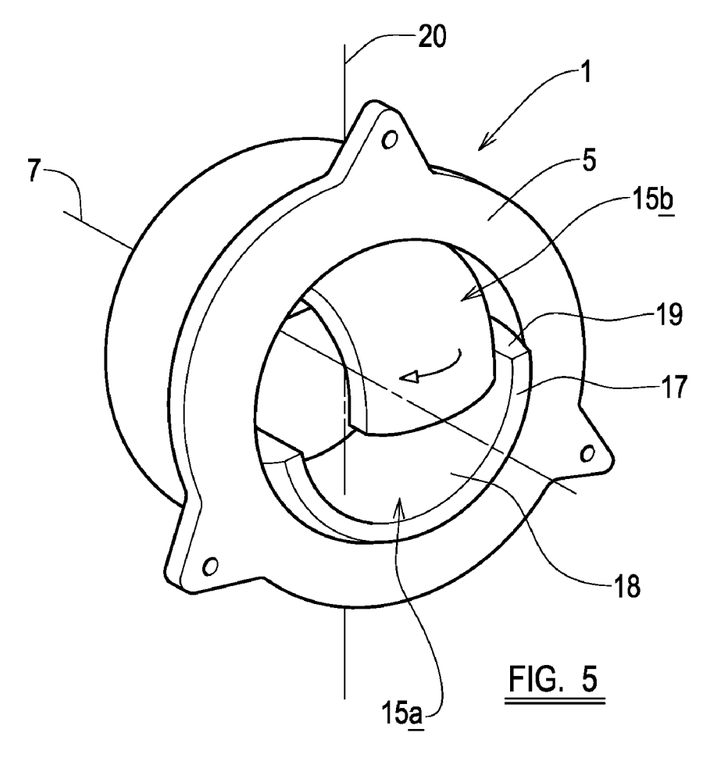

FIGS. 3 to 5 show stages of assembly for the spherical bearing arrangement 1 of FIGS. 1 and 2. FIG. 3 shows the bearing housing 2 of FIGS. 1 and 2 with split ball portion 15a seated therein, so that the split ball bearing surface 16 contacts the housing bearing surface 6. The split ball portion 15a is then rotated by 90 degrees about an axis 20 perpendicular to the bearing housing central axis 7, so that more of the split ball bearing surface 16 is contacting the housing bearing surface 6. Such an arrangement is shown in FIG. 4. It will be appreciated that when in the position shown in FIG. 4, the axial end faces 17 of the split ball portion 15a will be parallel to the respective axial end faces 5 of the bearing housing 2.

Split ball portion 15b is then inserted into the bearing housing 2 in a similar manner to split ball portion 15a, so that the split ball bearing surface 16 contacts the housing bearing surface 6. Such an arrangement is shown in FIG. 5.

Preferably, to aid insertion of split ball portion 15b, the axial length of the split ball portions 15a, 15b is smaller than the diameter of the composite ball bore 13, but this is not essential.

As with split ball portion 15a, split ball portion 15b is then rotated by 90 degrees about an axis 20 perpendicular to the bearing housing central axis 7, so that more of the split ball bearing surface 16 is contacting the housing bearing surface 6. The resultant arrangement is shown in FIGS. 1 and 2. It will be appreciated that, in the orientation described, with reference to FIGS. 1 and 2, the central axis 14 of the composite ball 3 will be coaxial with the central axis 7 of the bearing housing 2.

FIG. 5 shows a view of the two split ball portions 15a, 15b, during assembly. It will be appreciated that as split ball portion 15b is rotated from the position shown in FIG. 5, it will reach a point where the respective separation faces 19 of the two split ball portions 15a, 15b, will lie adjacent one another. Indeed, in a preferred embodiment, the respective separation faces 19 will frictionally engage with one another. In such an embodiment, it will be appreciated that the respective separation faces 19 are substantially co-planer with one another.

Figure 6:
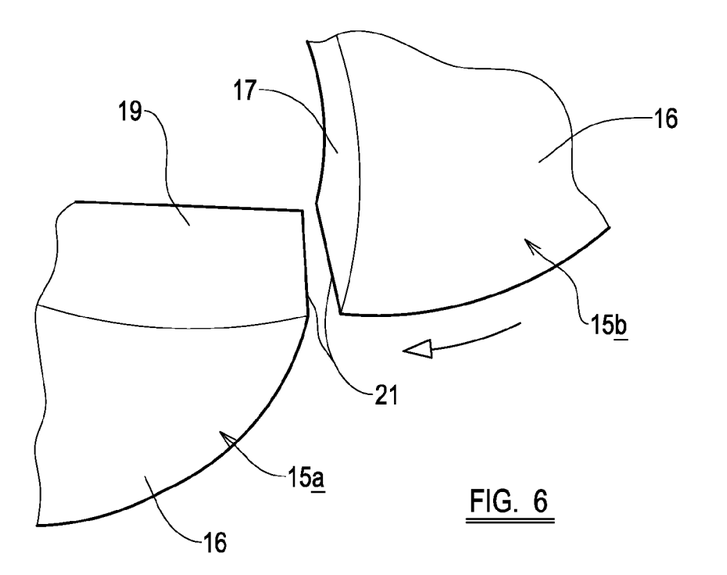
FIG. 6 shows a perspective view of a spherical bearing arrangement during assembly.

FIG. 6 shows an enlarged view of the split ball portions 15a, 15b during assembly, where split ball portion 15b has been rotated slightly compared to the arrangement shown in FIG. 5. As split ball portion 15b is rotated, it will be appreciated that an edge 21 of the separation face 19 adjacent the axial end face 17 of split ball portion 15b will lie adjacent the corresponding edge of split ball portion 15b. Given the fact that the two separation faces 19 preferably frictionally engage with one another, the respective edges 21 have a tendency to knock against each other as the two split ball portions are rotated. Another reason for this knocking is that, despite all reasonable care being taken during assembly, the two split ball portions will never be perfectly aligned when being rotated. As a consequence, minor adjustments need to be made as the two edges 21 come together, to ensure that the two split ball portions are aligned and so that the respective separation faces slidably and frictionally engage with one another. There also exist manufacturing tolerances in making the spit ball portions, meaning that their outer bearing surfaces may not be perfectly spherical or that their separation faces may not be perfectly co-planar—both of which increase the possibility of knocking.

As a consequence, the knocking has been found to chip the edge 21 of one or both the spit ball portions 15a, 15b. As a result, the edges 21 are no longer smooth, which can cause further damage as the edges 21 continue to knock against one another and start to abrade the surface of the separation face.

Referring to FIG. 6, it will be appreciated that due to the relative geometry and dimensions of the various surfaces of the split ball portions, the portion of the edge 21 adjacent the inner surface 18 of a split ball portion will knock with the corresponding portion of the neighbouring spit ball portion first. As the two split ball portions are further rotated, more of the edge 21 comes into contact/knocks with the edge 21 of the other split ball portion, until a point where the respective separation faces are frictionally engaged with one another and the edges 21 no longer knock against each other.

However, due to the relative geometry and dimensions of the split ball portions 15a, 15b and housing 2, it may be possible for the edges 21 to knock against one another substantially contemporaneously. That is to say, substantially all of the respective edges 21 come into contact with one another at the same time. It will be appreciated that this further increases the likelihood of damage occurring to the edges 21 and can even jam the arrangement so as to prevent further movement—clearly this is undesirable.

Damage caused to a portion of the edge 21 adjacent the spherical bearing surface 16 of the split ball portion 15 is particularly disadvantageous, as such damage may extend to the spherical bearing surface 16 itself, which will cause further damage and degradation in use of the bearing. The inner surface 18 of the split ball portion 15a, 15b may also be a bearing surface in use and thus any damage to a portion of the edge 21 in the vicinity of this surface should also preferably be avoided.

Figure 7:
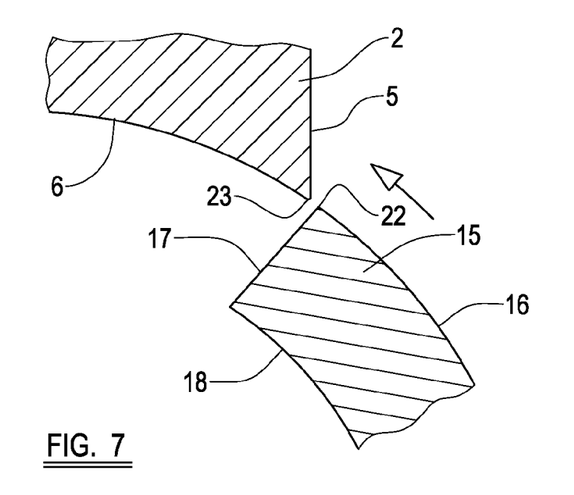
FIG. 7 shows a cross sectional view of a part of a spherical bearing arrangement during assembly.

FIG. 7 shows an enlarged cross sectional view similar to FIG. 1, showing a portion of the housing 2 and a split ball portion 15 during assembly. In FIG. 7, the split ball portion 15 is being rotated with respect to the bearing housing 2. The split ball portion 15 comprises an edge 22 between the axial end face 17 and spherical bearing surface 16. The bearing housing 2 also comprises an edge 23 between the axial end face 5 of the bearing housing 2 and the spherical housing bearing surface 6. It will be appreciated that as the split ball portion 15 and housing 2 rotate with respect to one another, the edges 22 and 23 have a tendency to knock against one another, in a similar manner to the knocking discussed above in relation to FIG. 6. However, whereas the knocking between edges 21 occurs largely as a result of misalignment, the knocking occurring between edges 22 and 23 will be due mainly to manufacturing tolerances.

As before, the knocking has been found to chip material from at least one of the edges 22, 23. As a result, the edges 22, 23 are no longer smooth, which can cause further damage as the edges continue to knock against one another and start to abrade either of the housing bearing surface or split ball spherical bearing surface.

Damage caused to either or both of edges 22 and 23 as shown in FIG. 6 is particularly undesirable since the bearing surface 6 adjacent the edge 23 of the bearing housing and bearing surface 16 adjacent the edge 22 of the split ball portion 15 form a bearing interface in use of the bearing. Thus, any damage caused to these edges 22, 23 is likely also to cause damage to the respective bearing surfaces 6, 16. During use of the bearing, the composite ball and housing can move with respect to one another at very high frequencies, albeit with low magnitude, so any damage of these surfaces will be only worsened during use of the bearing.

On the other hand, damage to the edges 21 of the split ball portions 15a, 15b between the separation face 19 and axial end face 17 will not generally adversely effect the operation of the bearing, since neither of the separation and axial end faces are bearing surfaces in use. Indeed, a bushing is often inserted into the bore of the composite ball which acts to inhibit relevant movement between the two split ball portions in use. Nevertheless, unnecessary damage to any edge of the split ball portion is obviously to be avoided if possible.

Figure 8:
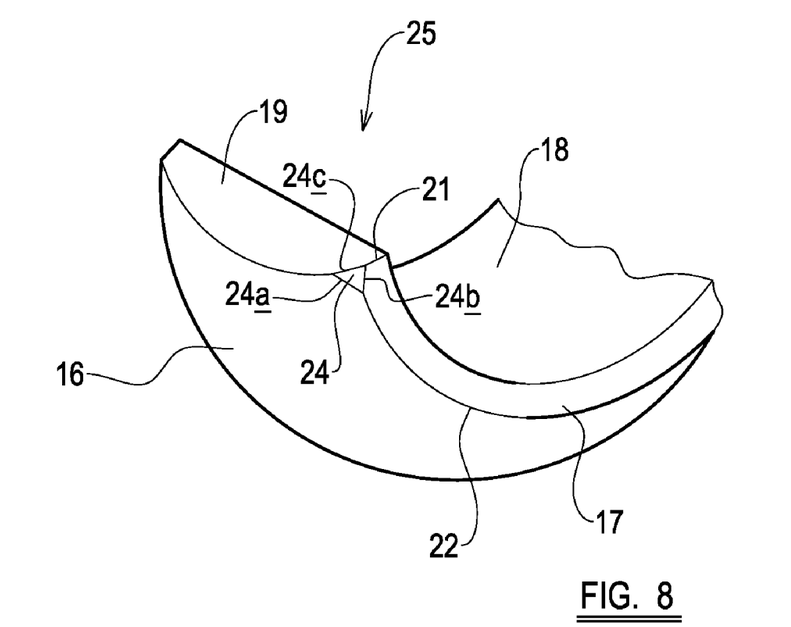
FIG. 8 shows a perspective view of a split ball portion embodying the present invention.

FIG. 8 shows a split ball portion 25 embodying the present invention. As with the split ball portion discussed above and as shown in FIGS. 1 to 7, the split ball portion 25 comprises a spherical outer bearing surface 16, two axial end faces 17, and two separation faces 19. In addition, the split ball portion comprises a chamfer surface 24 at the junction of the outer bearing surface 16, a separation face 19 and an axial end face 17. The chamfer surface 24 is planar and comprises three edges: one edge 24a being adjacent the outer bearing surface 16; another edge 24b being adjacent an axial end face 17; and another edge 24c being adjacent a separation face 19. The chamfer surface 24 is therefore bounded by all three of the outer bearing surface 16, axial end face 17 and separation face 19 of the split ball portion. Preferably, the chamfer surface is substantially triangular.

Figure 9:
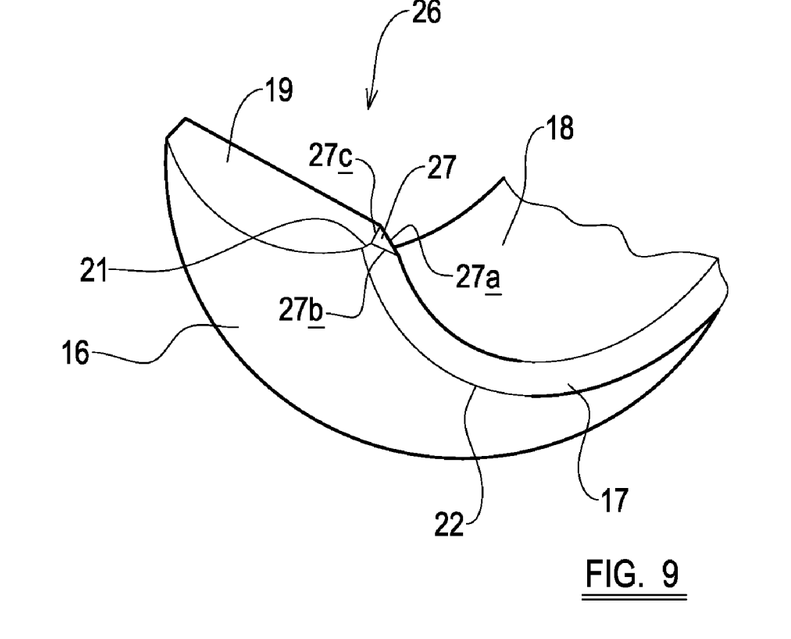
FIG. 9 shows a perspective view of another split ball portion embodying the present invention.

FIG. 9 shows another embodiment of the present invention. Here, the split ball portion 26 is provided with a chamfer surface 27 at the junction of the inner surface 18, a separation face 19 and an axial end face 17. The chamfer surface 27 is planar and comprises three edges: one edge 27a being adjacent the inner surface 18; another edge 27b being adjacent an axial end face 17; and another edge 27c being adjacent a separation face 19. The chamfer surface 27 is therefore bounded by all three of the inner surface 18, axial end face 17 and separation face 19 of the split ball portion. Preferably, the chamfer surface 27 is substantially triangular.

Preferably the three edges 24a/27a, 24b/27b and 24c/27c are of equal length. Alternatively, edge 24a/27a is longer in length than edge 24b/27b. Preferably, the chamfer surface subtends an angle with all of the adjacent surfaces. Advantageously, the obtuse angle subtended by the chamfer surface 24/27 and the separation face 19 is greater than the obtuse angle subtended by the chamfer surface 24/27 and the axial end face 17.

Figure 10:
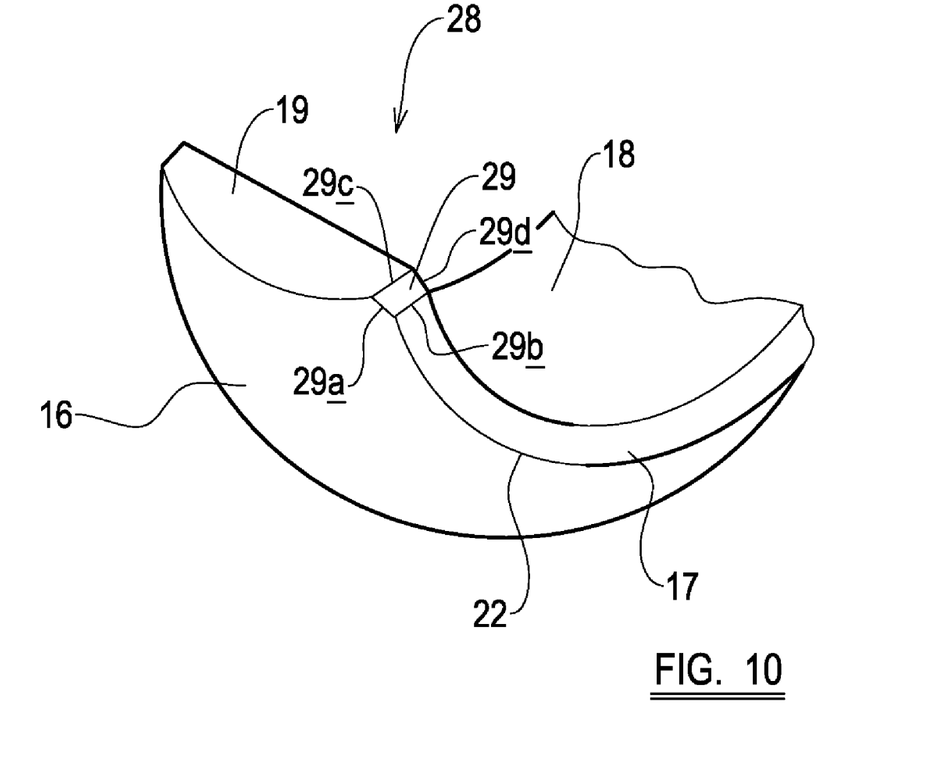
FIG. 10 shows a perspective view of yet another split ball portion embodying the present invention.

FIG. 10 shows another split ball portion 28 embodying the present invention. For simplicity, like references are used to denote like features as shown in FIGS. 8 and 9. The split ball portion 28 comprises a chamfer surface 28 at the junction of the outer bearing surface 16, an axial end face 17, the inner surface 18 and the separation face 19. As with chamfer surfaces 24 and 27 of the embodiments above, chamfer 29 is planar but this time comprises four edges: one edge 29a being adjacent the outer bearing surface 16; another edge 29b being adjacent an axial end face 17; another edge 29c being adjacent a separation face 19; and another edge 29d being adjacent the inner surface 18. The chamfer surface 29 is therefore bounded by all four of the outer bearing surface 16, axial end face 17, inner surface 18 and separation face 19 of the split ball portion. Preferably, the chamfer surface 29 is substantially rectangular or square.

Preferably, edges 29a and 29d are of equal length. Advantageously, edges 29b and 29c are of equal length. Alternatively, the edge 29a may be longer than edge 29d; and edge 29c may be longer than 29b. Preferably, the chamfer surface subtends an angle with all of the adjacent surfaces. Advantageously, the obtuse angle subtended by the chamfer surface 29 and the separation face 19 is greater than the obtuse angle subtended by the chamfer surface 29 and the axial end face 17.

Due to the spherical surface of the outer bearing surface 16, edges 24a, 27a and 29a are curved. Due to the cylindrical nature of the inner surface 18, edges 27d and 29d are also curved. Due to the planar surface of the separation face 19 and axial end face 17, edges 24b, 27b, 29b, 24c, 27c and 29c are linear. It will be appreciated that this is not essential to realise the invention however. Preferably, there is a smooth transition on at least one of the edges.

Although the chamfer surfaces are described as being planar, they could alternatively not be planar and, instead, have a curved surface.

Preferably, the split ball portion comprises two chamfer surfaces; each chamfer surface being on a respectively opposing axial end of the split ball portion and on different separation faces. Thus, when two spit ball portions having two chamfer surfaces in the same configuration and location are assembled into a housing and rotated in a given direction, the respective pairs of chamfer surfaces are incident with one another. Advantageously, the split ball portions are provided with four chamfer surfaces, so that the split ball portions can be rotated with respect to one another in either direction during assembly.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A split ball portion for a spherical bearing arrangement, which split ball portion is to form one of a plurality of split ball portions to be arranged together in a bearing housing of the spherical bearing arrangement to form a composite ball, the split ball portion comprising:
   an outer bearing surface;
   at least one separation face, which lies adjacent a separation face of a neighbouring split ball portion when forming the composite ball; and
   at least one axial end face,
   the split ball portion comprising at least one chamfer surface at the junction of at least the separation face and the axial end face.

2. A split ball portion according to claim 1, wherein the split ball portion further has an inner surface.

3. A split ball portion according to claim 2, wherein the chamfer surface is at the junction of at least: the inner surface, the separation face and the axial end face.

4. A split ball portion according to claim 2, wherein the chamfer surface is at the junction of the outer bearing surface, the separation face, the axial end face and the inner surface.

5. A split ball portion according to claim 2, wherein the chamfer surface has at least four edges.

6. A split ball portion according to claim 5, wherein the chamfer surface is substantially rectangular.

7. A split ball portion according to claim 2, wherein the inner surface is substantially cylindrical.

8. A split ball portion according to claim 1, wherein the chamfer surface is substantially triangular.

9. A split ball portion according to claim 1, wherein the chamfer surface has at least three edges, one edge being adjacent the axial end face.

10. A split ball portion according to claim 9, wherein the length of each edge is equal.

11. A split ball portion according to claim 9, wherein the split ball portion has an inner surface and wherein the length of the edge of the chamfer surface adjacent the axial end face is less than the length of either of the other two edges.

12. A split ball portion according to claim 1, wherein the chamfer surface is at the junction of at least: the outer bearing surface, the separation face and the axial end face.

13. A split ball portion according to claim 1, wherein the chamfer surface is substantially planar.

14. A split ball portion according to claim 1, wherein the chamfer surface subtends an angle with the adjacent surfaces.

15. A split ball portion according to claim 1, wherein there is a smooth transition between the chamfer surface and at least one of the adjacent surfaces.

16. A split ball portion according to claim 1, wherein the obtuse angle subtended by the chamfer surface and the separation face is greater than the obtuse angle subtended by the chamfer surface and the axial end face.

17. A split ball portion according to claim 1, wherein the split ball portion comprises two separation faces and two axial end faces.

18. A split ball portion according to claim 1, wherein the split ball portion comprises two chamfer surfaces.

19. A split ball portion according to claim 18, wherein the two chamfer surfaces are provided on respectively opposing axial end faces and on different separation faces.

20. A split ball portion according to claim 1, wherein the split ball portion comprises four chamfer surfaces.

21. A split ball portion according to claim 1, wherein the separation and axial end faces are substantially planar.

22. A split ball portion according to claim 1, comprising a chamfer surface having a curved edge adjacent the outer bearing surface.

23. A split ball portion according to claim 1, comprising a chamfer surface having linear edges adjacent the axial end face and the separation face.

24. A spherical bearing assembly, comprising:
    a bearing housing; and
    at least two split balls portions according to claim 1;
    wherein the split ball portions are arranged together in the bearing housing so as to form a composite ball.

25. A split ball portion for a spherical bearing arrangement, which split ball portion is configured to be assembled with a plurality of split ball portions to form a composite ball, the split ball portion comprising:
    an outer surface and an inner surface, the inner and outer surfaces being curved around a central axis of the split ball portion;
    a separation face extending across the split ball portion between the inner and outer surfaces and defining an axial edge that extends from a first junction of the separation face with the inner surface to a second junction of the separation face with the outer surface; and
    a chamfer formed in the axial edge, thereby to facilitate sliding engagement of the separation face of one ball portion with the separation face of a corresponding ball portion during assembly of the split ball portions to form a composite ball.

26. The arrangement of claim 25 wherein the chamfer is located at the first junction.

27. The arrangement of claim 25 wherein the chamfer is located at the second junction.

28. The arrangement of claim 25 wherein the chamfer extends from the first to the second junction.

29. A method of assembling a spherical bearing arrangement, the method comprising:
    providing a bearing housing;
    providing at least two split ball portions comprising: an outer bearing surface; at least one separation face, which lies adjacent a separation face of a neighbouring split ball portion when forming the composite ball; and at least one axial end face, the split ball portion comprising at least one chamfer surface at the junction of at least the separation face and the axial end face;
    assembling the split ball portions, in turn, in the bearing housing so as to form a composite ball.

* * * * *